United States Patent
Chiang et al.

(10) Patent No.: US 10,921,918 B2
(45) Date of Patent: Feb. 16, 2021

(54) TOUCH DISPLAY DEVICE AND METHOD FOR DRIVING THE SAME

(71) Applicant: AU Optronics Corporation, Hsin-Chu (TW)

(72) Inventors: Chen-Hao Chiang, Hsin-Chu (TW); Yu-Hsin Hsieh, Hsin-Chu (TW); Chia-Chi Lee, Hsin-Chu (TW); Zeng-De Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/744,529

(22) Filed: Jan. 16, 2020

(65) Prior Publication Data
US 2020/0379594 A1    Dec. 3, 2020

(30) Foreign Application Priority Data

May 27, 2019   (TW) .................................. 108118285

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 3/0416* (2013.01); *G06F 2203/04103* (2013.01)

(58) Field of Classification Search
CPC .................. G06F 3/0412; G06F 3/047; G06F 2203/04103; G06F 3/0416
See application file for complete search history.

(56) References Cited

U.S. PATENT DOCUMENTS

| | | | |
|---|---|---|---|
| 2015/0048846 A1* | 2/2015 | Post | G06F 3/011 324/663 |
| 2015/0277633 A1* | 10/2015 | Jiang | G06F 3/046 345/174 |
| 2016/0202815 A1 | 7/2016 | Zheng | |
| 2016/0291777 A1 | 10/2016 | Xi et al. | |
| 2016/0349921 A1* | 12/2016 | Mizuhashi | G06F 3/0412 |
| 2018/0260065 A1 | 9/2018 | Huang et al. | |
| 2018/0307368 A1* | 10/2018 | Koide | G02F 1/136286 |
| 2019/0339811 A1* | 11/2019 | Katsuta | G06F 3/0412 |

FOREIGN PATENT DOCUMENTS

| | | |
|---|---|---|
| CN | 104699347 A | 6/2015 |
| CN | 206162470 U | 5/2017 |
| CN | 2016162470 U | 5/2017 |
| CN | 107562283 A | 1/2018 |

* cited by examiner

*Primary Examiner* — Muhammad N Edun
(74) *Attorney, Agent, or Firm* — McClure, Qualey & Rodack, LLP

(57) ABSTRACT

A touch display device has a display area and includes a substrate, induction electrodes, first switches, and a first driver. The induction electrodes are disposed on the substrate and located within the display area, and the induction electrodes are arranged into an array. Each of the first switches has a first gate. Two adjacent induction electrodes in a same column of the array are electrically connected to each other through at least one of the first switches. The first driver is electrically connected to the first gates of the first switches.

9 Claims, 10 Drawing Sheets

TOUCH DISPLAY DEVICE AND METHOD FOR DRIVING THE SAME

RELATED APPLICATIONS

This application claims priority to Taiwan Application Serial Number 108118285, filed May 27, 2019, which is herein incorporated by reference.

BACKGROUND

Field of Invention

The present disclosure relates to a touch display device and a method for driving the same.

Description of Related Art

With the development of science and technology, electronic apparatuses with touch display devices have become mainstream products in the consumer market, such as smart phones, tablet computers, notebook computers, or vehicle control panels. Because the touch display devices can allow users to directly interact with display contents, the user experience can be improved.

The functionality of these electronic apparatuses also become increasingly versatile with the market trends. For example, when considering the touch, gestures can be used for hovering touches in addition to touches achieved through physically contacting a panel. In this regard, a user may encounter the problem of insufficient touch sensing amount since the user is separated from the panel by a distance during the hovering touch.

For the foregoing reasons, there is a need to improve the touch accuracy of a hovering touch, which has become one of the developing subjects in related fields.

SUMMARY

A touch display device is provided. The touch display device has a display area, and comprises a substrate, induction electrodes, first switches, and a first driver. The induction electrodes are disposed on the substrate and located within the display area, and the induction electrodes are arranged into an array. Each of the first switches has a first gate. Two adjacent induction electrodes in a same column of array are electrically connected to each other through the first switch. The first driver is connected to the first gates of the first switches.

In the foregoing, the first switches are located within the display area, and each of the first switches has a first source/drain and a second source/drain, and the first source/drain and the second source/drain of each of the first switches are respectively connected to two adjacent induction electrodes in the array.

In the foregoing, the touch display device further comprises second switches and a second driver. The second switches are located within the display area, and each of the second switches has a second gate, a third source/drain, and a fourth source/drain. The third source/drain and the fourth source/drain of the each of the second switches are respectively connected to two adjacent induction electrodes in a same row as the each of the second switches of the array. The second driver is connected to the second gates of the second switches.

In the foregoing, the array has M columns and N rows, and each of the induction electrodes from a second column to an M−1th column and from a second row to an N−1th row of the array is surrounded by two first switches and two second switches together, where each of M and N is a positive integer greater than 3.

In the foregoing, the touch display device further comprises wirings and a touch circuit. The induction electrodes are respectively connected to the touch circuit through the wirings.

In the foregoing, each of the first switches has a first source/drain, and the first sources/drains are respectively connected to different induction electrodes.

In the foregoing, the touch display device further comprises a first wiring and a second wiring. Each of the first switches has a second source/drain. The second sources/drains of a first group of the first switches are together connected to the first wiring, and the second sources/drains of a second group of the first switches are together connected to the second wiring.

In the foregoing, the touch display device further comprises a hovering touch circuit. The hovering touch circuit is connected to the first switches through the first wiring and the second wiring.

In the foregoing, the touch display device further comprises pixel electrodes. The pixel electrodes are located within the display area, and a vertical projection of the induction electrodes on the substrate at least partially overlaps a vertical projection of the pixel electrodes on the substrate.

The present disclosure provides a method for driving a touch display device. The method comprises the following steps: turning on switches during a first period; outputting a first hovering touch signal through a first wiring during the first period, so that the first hovering touch signal is input to a first sub-array of induction electrodes through a first group of the switches; outputting a second hovering touch signal through a second wiring during the first period, so that the second hovering touch signal is input to a second sub-array of induction electrodes through a second group of the switches; turning off the switches during a second period, wherein the second period is later than the first period; turning on the switches during a third period, wherein the third period is later than the second period; outputting a third hovering touch signal through the second wiring during the third period, so that the third hovering touch signal is input to the second sub-array of induction electrodes through the second group of the switches; and outputting a fourth hovering touch signal through a third wiring during the third period, so that the fourth hovering touch signal is input to a third sub-array of induction electrodes through a third group of the switches.

Through the above configuration, different induction electrodes can be connected after turning on switches so as to form a plurality of sub-arrays of induction electrodes. As a result, during the hovering touch mode of the touch display device, the touch accuracy and sensitivity can be improved by improving the sensing area of the hovering touch for the touch display device.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 10 depicts a side schematic diagram of the touch display device according to the first embodiment of the present disclosure;

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and elements are schematically depicted in order to simplify the drawings.

It will be understood that, although the terms first, second, third etc. may be used herein to describe various elements, components, areas or regions, these elements, components, areas or regions should not be limited by these terms. These terms are only used to distinguish one element, component, area or region from another element, component, area or region. Thus, a first element, component, area or region discussed below could be termed a second element, component, area or region without departing from the teachings of the present disclosure. As used herein, "about," "approximately," or "substantially" includes the value and average values within acceptable deviations. For example, "about," "approximately," or "substantially" can mean within one or more standard deviations of the value, or within ±30%, ±20%, ±15%, ±10%, ±5% of the value.

A touch display device according to the present disclosure comprises induction electrodes and first switches. The induction electrodes are arranged into an array, and two adjacent induction electrodes in a same column of the array are electrically connected to each other through a first switch. Through this configuration, after turning on switches, different induction electrodes can form a plurality of sub-arrays of induction electrodes through connection, so as to improve the sensing area when the touch display device is in a hovering mode.

Figure 1A:
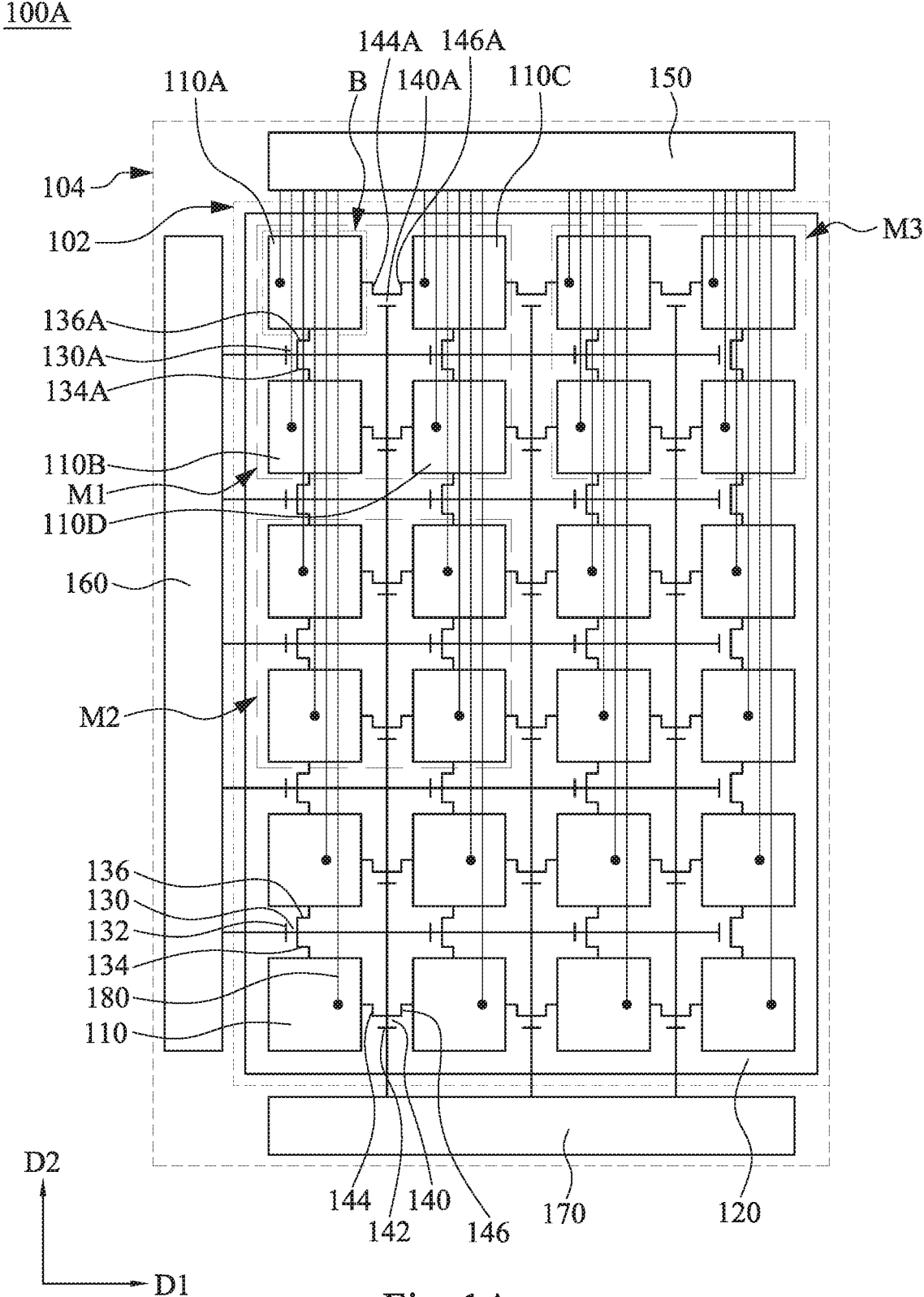
FIG. 1A depicts a top schematic diagram of a touch display device according to a first embodiment of the present disclosure.
Figure 1B:
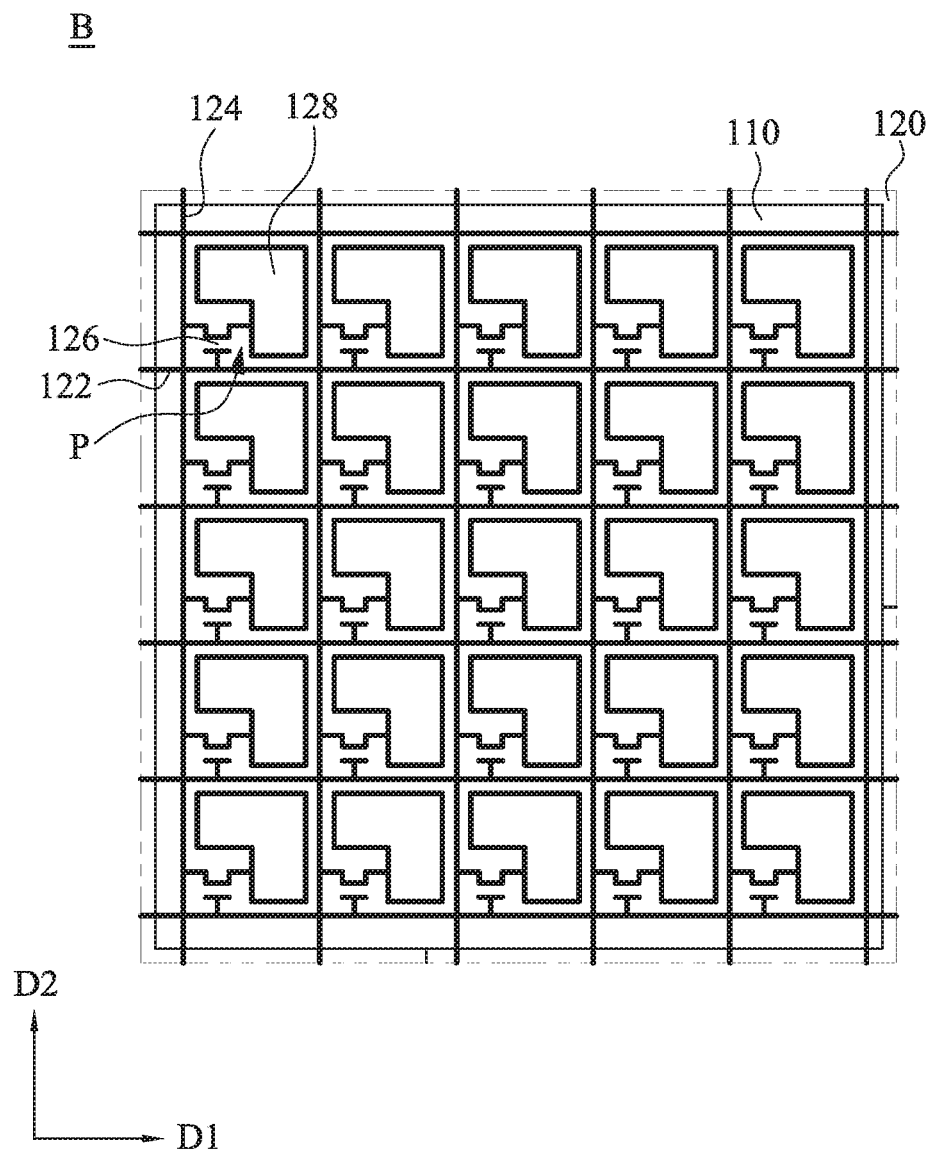
FIG. 1B depicts an enlarged schematic diagram of an induction electrode and a structure underneath the induction electrode in region B of FIG. 1A.
Figure 1C:
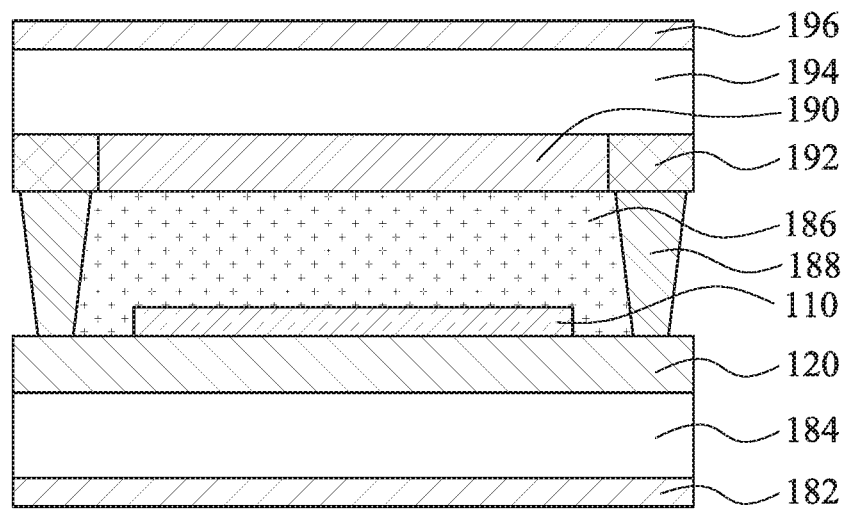
FIG. 1D depicts a waveform diagram of the touch display device in FIG. 1A when operating.

A description is provided with reference to FIG. 1A and FIG. 1B. FIG. 1A depicts a top schematic diagram of a touch display device 100A according to a first embodiment of the present disclosure. FIG. 1B depicts an enlarged schematic diagram of an induction electrode 110 and a structure underneath the induction electrode 110 in region B of FIG. 1A. In order not to make FIG. 1A too complicated, part of elements of the touch display device 100A (such as thin film transistors 126 and pixel electrodes 128 located underneath the induction electrode 110) are not shown in FIG. 1A, but are shown in FIG. 1B. To facilitate illustration, a first direction D1 and a second direction D2 are depicted in FIG. 1A and FIG. 1B. The first direction D1 is different from the second direction D2. For example, the first direction D1 and the second direction D2 may be orthogonal to each other, and may be a transverse direction and a longitudinal direction of both FIG. 1A and FIG. 1B.

The touch display device 100A has a display area 102 and a peripheral area 104. The peripheral area 104 is located outside the display area 102. The touch display device 100A can provides an image through the display area 102, and a user can perform a touch operation within a range over the display area 102. The peripheral area 104 may be regarded as a bezel of the touch display device 100A, which may be, for example, an area where drivers, circuits, or wirings are placed.

The touch display device 100A comprises induction electrodes 110, a substrate 120, first switches 130, second switches 140, a touch circuit 150, a first driver 160, a second driver 170, and wirings 180. The induction electrodes 110, the substrate 120, the first switches 130, and the second switches 140 may be located within the display area 102. The touch circuit 150, the first driver 160, and the second driver 170 are located within the peripheral area 104.

The substrate 120 may be an array substrate, and is configured to form a pixel array within the display area 102. For example, the substrate 120 comprises scan lines 122, data lines 124, thin film transistors 126, and pixel electrodes 128 as shown in FIG. 1B. The scan lines 122 may extend along the first direction D1 and be disposed along the second direction D2. The data lines 124 may extend along the second direction D2 and be disposed along the first direction D1. The scan lines 122 and the data lines 124 may cross each other so as to form a plurality of pixel areas P within the display area 102. The thin film transistors 126 are respectively disposed in the pixel areas P, and a gate and a source of each of the thin film transistors 126 are respectively connected to the scan line 122 and the data line 124 correspondingly. The pixel electrodes 128 are respectively disposed in the pixel areas P, and are connected to drains of the thin film transistors 126 correspondingly. A material of the pixel electrodes 128 comprises a transparent conductive material, such as indium tin oxide, indium zinc oxide, zinc oxide, carbon nanotubes, indium gallium zinc oxide, or some other suitable materials.

The induction electrodes 110 are disposed on the substrate 120, and are located within the display area 102. The induction electrodes 110 may be arranged into an array along the first direction D1 and the second direction D2. For example, the induction electrodes 110 of FIG. 1A are an array arranged in four columns and six rows. However, the present disclosure is not limited in this regard. In other embodiments, the induction electrodes 110 are another array that can be arranged in M columns and N rows, where each of M and N is a positive integer.

A vertical projection of the induction electrodes 110 on the substrate 120 can at least partially overlap a vertical projection of the pixel electrodes 128 on the substrate 120, and an area of the induction electrode 110 can allow a single induction electrode 110 to overlap more than one pixel electrodes 128. In addition, the induction electrodes 110 can be connected to the touch circuit 150 respectively through the wirings 180, so that the touch circuit 150 can output touch signals to the induction electrodes 110 independently. A material of the induction electrodes 110 comprises a transparent conductive material, such as indium tin oxide, indium zinc oxide, zinc oxide, carbon nanotubes, indium gallium zinc oxide, or some other suitable materials.

The touch display device 100A can be switched between a display mode and a touch mode, and the induction electrodes 110 can provide different usages in different modes. For example, a description is provided with reference to FIG. 10. FIG. 10 depicts a side schematic diagram of the touch display device 100A according to the first embodiment of the present disclosure.

The touch display device 100A may further comprise a first polarizer 182, a first transparent substrate 184, a display medium layer 186, a spacer 188, a color filter layer 190, a light-shielding layer 192, a second transparent substrate 194, and a second polarizer 196. Each of the first transparent substrate 184 and the second transparent substrate 194 may be a glass substrate. The first polarizer 182 is disposed on a lower surface of the first transparent substrate 184, and the above substrate 120 that serves as the array substrate may be disposed on an upper surface of the first transparent substrate 184. The induction electrode 110 is disposed on the substrate 120. The display medium layer 186 is disposed on the induction electrode 110 and the substrate 120. The display medium layer 186 may comprise a display medium (not shown in the figure), for example, liquid crystal molecules. The color filter layer 190, the light-shielding layer 192, and the second transparent substrate 194 may be disposed on the display medium layer 186. The color filter layer 190 and the light-shielding layer 192 are formed on a lower surface of the second transparent substrate 194. The color filter layer 190 may comprise color resist layers, such as a red color resist layer, a green color resist layer, a blue color resist layer, or a combination thereof. The light-shielding layer 192 may be a black matrix. The second polarizer 196 is disposed on an upper surface of the second transparent substrate 194. The spacer 188 is disposed between the first transparent substrate 184 and the second transparent substrate 194.

When the touch display device 100A is in the display mode, the induction electrodes 110 can serve as common electrodes. At this time, scan lines and data lines (that is, the scan lines 122 and the data lines 124 of FIG. 1B) can be used to input electrical signals to thin film transistors (that is, the thin film transistor 126 of FIG. 1B) to drive the corresponding pixel electrodes (that is, the pixel electrode 128 of FIG. 1B). As a result, the pixel electrodes and the induction electrodes 110 that serve as the common electrodes together couple an electric field. This coupled electric field can be used for controlling an optical activity of the display medium layer 186, so that light beams entering into an interior of the touch display device 100A through the first polarizer 182 can pass through the second polarizer 196 and leave the touch display device 100A after passing through the display medium layer 186 and the color filter layer 190. The touch display device 100A can thus display an image corresponding to the light beams.

When the touch display device 100A is in the touch mode, a touch circuit (that is, the touch circuit 150 of FIG. 1A) will output a touch signal to the induction electrodes 110 so that the induction electrodes 110 can couple capacitors, and the capacitors coupled by the induction electrodes 110 can be used as touch sensing sources. At this time, if the user changes capacitors coupled by the induction electrode(s) 110 due to a touch operation, touch operation coordinates of the user can be obtained through calculation. In other words, the touch display device 100A can provide a self-capacitive touch function through the induction electrodes 110.

In addition, through using the capacitors coupled by the induction electrodes 110 as the touch sensing sources, not only can the touch operation of the touch display device 100A be implemented through a physical contact, but the touch operation of the touch display device 100A can also be performed through a hovering touch function. That is to say, the touch mode of the touch display device 100A can be classified into a click touch mode (that is, through the physical contact) and a hovering touch mode.

Although in the present embodiment the induction electrodes 110 are disposed on the substrate 120 and are closer to the display medium layer 186 than the pixel electrodes (that is, the pixel electrode 128 of FIG. 1B), the present disclosure is not limited in this regard. In other embodiments, the pixel electrodes of the substrate 120 may be closer to the display medium layer 186 than the induction electrodes 110, and the pixel electrodes of the substrate 120 can also couple capacitors to serve as touch sensing sources. In addition to that, the layer used as the common electrodes may have a slit.

With additional reference to FIG. 1A, different induction electrodes 110 can be connected to one another by using the first switch(s) 130 and the second switch(s) 140 correspondingly, so as to improve the sensing area of the touch display device 100A in the hovering touch mode. The following description further illustrates the improvement of the sensing area.

Two adjacent induction electrodes 110 in a same column of the array can be electrically connected through the first switch 130. In greater detail, the first switch 130 may be a transistor, such as a thin film transistor, and each of the first switches 130 has a first gate 132, a first source/drain 134, and a second source/drain 136. The first source/drain 134 and the second source/drain 136 of each of the first switches 130 are respectively connected to two adjacent induction electrodes 110 in the array. For example, a first source/drain 134A and a second source/drain 136A of a first switch 130A are respectively connected to adjacent induction electrodes 110B and 110A.

In other words, each of the first switches 130 can be electrically connected to two consecutive rows of induction electrodes 110 in each column of the array. For the first switches 130 electrically connected to the same two consecutive rows, the first gates 132 thereof can be together connected to the first driver 160. For example, "the first switches 130 of a first row" are electrically connected the induction electrodes 110 of a first row and a second row in each column of the array, and the first gates 132 of the first switches 130 of the first row can be together connected to the first driver 160. Similarly, "the first switches 130 of a second row" can be electrically connected to the induction electrodes 110 of the second row and a third row in each column of the array, and the first gates 132 of the first switches 130 of the second row can be together connected to the first driver 160.

The first driver 160 may comprise a drive circuit. The first driver 160 can be configured to drive or turn off the first switches 130, and the first driver 160 can independently drive or turn off different rows of the first switches 130. For example, during a same period, the first driver 160 can drive the first switches 130 of the first row and turn off the first switches 130 of the second row.

Two adjacent induction electrodes 110 in a same row of the array can be electrically connected through the second switch 140. In greater detail, each of the second switches 140 has a second gate 142, a third source/drain 144, and a fourth source/drain 146. The third source/drain 144 and the fourth source/drain 146 of each of the second switches 140 are respectively connected to two adjacent induction electrodes 110 in the array. For example, a third source/drain 144A and a fourth source/drain 146A of a second switch 140A are respectively connected to the induction electrode 110A and an induction electrode 110C adjacent to each other.

In other words, each of the second switches 140 can be electrically connected to two consecutive columns of induction electrodes 110 in each row of the array. For the second switches 140 electrically connected to the same two consecutive columns, the second gates 142 thereof can be together connected to the second driver 170. For example, "the second switches 140 of a first column" can be electrically connected the induction electrodes 110 of a first column and a second column in each row of the array, and the second gates 142 of the second switches 140 of the first column can be together connected to the second driver 170. Similarly, "the second switches 140 of a second column" can be electrically connected to the induction electrodes 110 of the second column and a third column in each row of the array, and the second gates 142 of the second switches 140 of the second column can be together connected to the second driver 170.

The second driver 170 may comprise a drive circuit. The second driver 170 can be configured to drive or turn off the second switches 140, and the second driver 170 can independently drive or turn off different columns of the second switches 140. For example, during a same period, the second driver 170 can drive the second switches 140 of the first column and turn off the second switches 140 of the second column.

Although in the present embodiment the switches are classified into the first switches 130 and the second switches 140, the first switches 130 and the second switches 140 may have the same transistor structure. The difference between them is that the first switches 130 connect the induction electrodes 110 of different rows, whereas the second switches 140 connect the induction electrodes 110 of different columns. That is, the first switches 130 and the second switches 140 are used to name these switches for easy identification.

With the above configuration, each of the induction electrodes 110 is electrically connected to its adjacent induction electrode 110 through at least two switches. For the induction electrodes 110 located at four corners of the array, each of them connects one first switch 130 and one second switch 140. For the induction electrodes 110 located on a boundary of the array, each of them connects three switches. For the induction electrodes 110 located within the range from the second column to the third column and from the second row to the sixth row of the array, each of them is surrounded by two first switches 130 and two second switches 140 together.

Through the above configuration, when the touch display device 100A is in the hovering touch mode, different induction electrodes 110 can be electrically connected together through turning on the first switches 130 and the second switches 140 to improve the sensing area. A further description is provided as follows with reference to waveforms output by the touch circuit 150, the first driver 160, and the second driver 170.

Figure 1D:
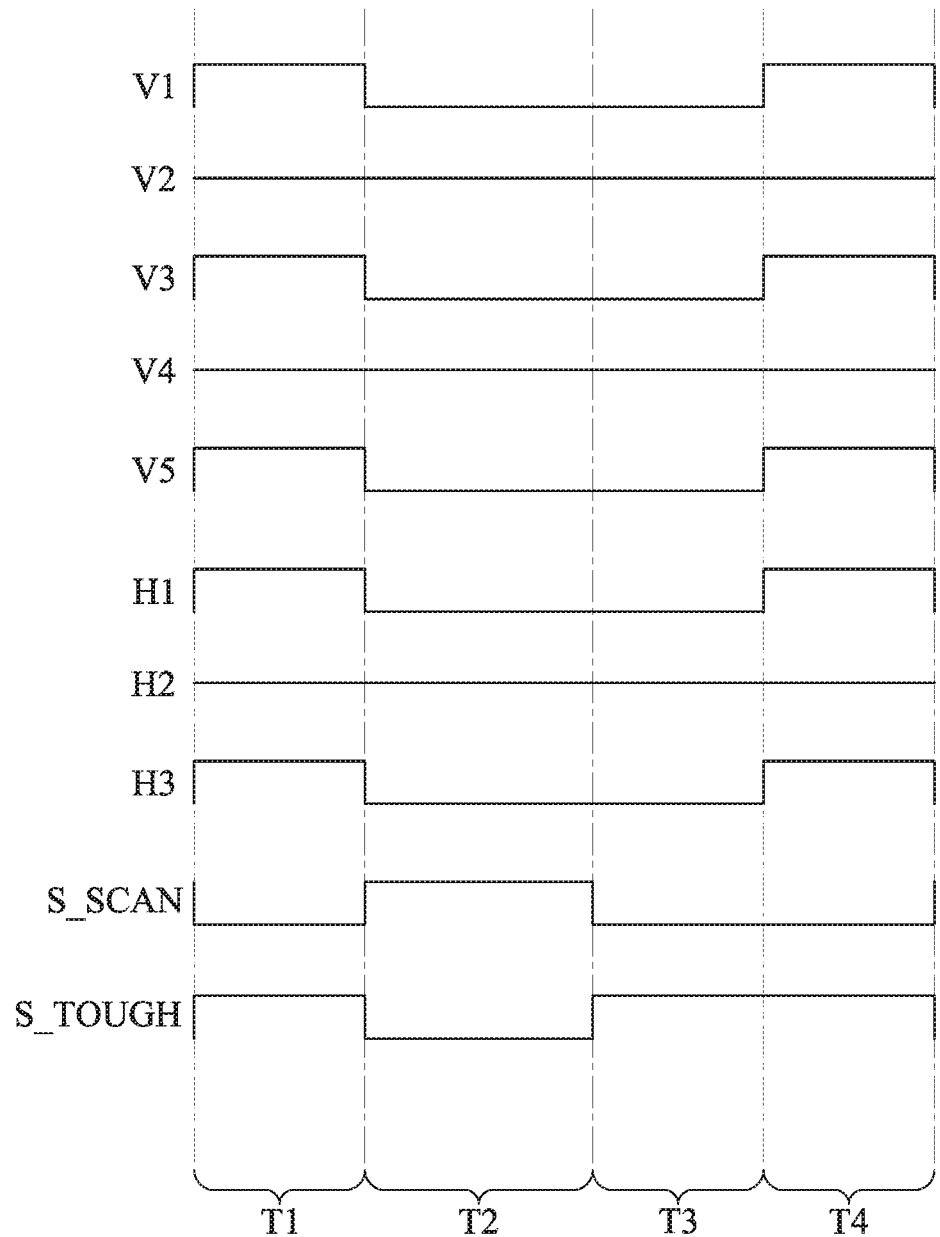

A description is provided with reference to FIG. 1A and FIG. 1D. FIG. 1D depicts a waveform diagram for driving the touch display device 100A. The waveform diagram depicted in FIG. 1D can be sequentially divided into a first period T1, a second period T2, a third period T3, and a fourth period T4.

Waveforms of the first switches 130 of the respective rows are labeled as the first switches of the first row V1, the first switches of the second row V2, the first switches of the third row V3, the first switches of the fourth row V4, and the first switches of the fifth row V5 in FIG. 1D. Waveforms of the second switches 140 of the respective columns are labeled as the second switches of the first column H1, the second switches of the second column H2, and the second switches of the third column H3 in FIG. 1D. A scan signal S_SCAN represents the signal input to scan lines (that is, the scan lines 122 of FIG. 1B). A touch signal S_TOUCH represents the signal output from the touch circuit 150.

The first period T1 is a period corresponding to the hovering touch mode of the touch display device 100A. During the first period T1, the first switches 130 of odd rows (the first switches of the first row V1, the first switches of the third row V3, and the first switches of the fifth row V5) can be turned on, and the first switches 130 of even rows (the first switches of the second row V2 and the first switches of the fourth row V4) can be turned off through the first driver 160.

In the present disclosure, the "turn on the switch" refers to transferring the signal input to the gate of the switch from a disable level (for example, a low voltage) to an enable level (for example, a high voltage) so as to turn on the switch. Conversely, in the present disclosure, the "turn off the switch" refers to transferring the signal input to the gate of the switch from the enable level to the disable level so as to turn off the switch.

During the first period T1, the second switches 140 of odd columns (the second switches of the first column H1 and the second switches of the third column H3) can be turned on, and the second switches 140 of an even column (the second switches of the second column H2) can be turned off through the second driver 170.

During the first period T1, the scan signal S_SCAN is at the disable level to turn off the thin film transistors in the substrate 120 (that is, the thin film transistors 126 of FIG. 1B). During the first period T1, the touch signal S_TOUCH is at the enable level. At this time, the touch signal S_TOUCH can be used for performing hovering touch. Although in FIG. 1D the touch signal S_TOUCH is depicted as a square wave during the first period T1, the touch signal S_TOUCH may be a plurality of pulse waves during the first period T1.

Through the above driving manner, the induction electrodes 110 in the array can be connected because the switches are turned on correspondingly during the first period T1 so as to form a plurality of sub-arrays of induction electrodes. For example, the induction electrodes 110A, 110B, 110C, 110D can be connected because the first switches 130 of the first row and the second switches 140 of the first column are turned on so as to form a first sub-array of induction electrodes M1.

Similarly, the induction electrodes 110 from the first column to the second column and from the third row to the fourth row of the array are also connected because the first switches 130 of the third row and the second switches 140 of the first column are turned on so as to form a second sub-array of induction electrodes M2. The induction electrodes 110 from the third column to the fourth column and from the first row to the second row of the array are also connected because the first switches 130 of the first row and the second switches 140 of the third column are turned on so as to form a third sub-array of induction electrodes M3.

For the first sub-array of induction electrodes M1 and the second sub-array of induction electrodes M2, the first sub-array of induction electrodes M1 and the second sub-array of induction electrodes M2 are electrically isolated from each other because the first switches 130 of the second row are turned off. As a result, the first sub-array of induction electrodes M1 and the second sub-array of induction electrodes M2 can recognize different touch coordinates. Here, "the first sub-array of induction electrodes M1 and the second sub-array of induction electrodes M2 are electrically isolated from each other" refers to that capacitors coupled by each of the first sub-array of induction electrodes M1 and the second sub-array of induction electrodes M2 during a hovering touch period are identifiable. Similarly, for the first sub-array of induction electrodes M1 and the third sub-array of induction electrodes M3, the first sub-array of induction electrodes M1 and the third sub-array of induction electrodes M3 are electrically isolated from each other because the second switches 140 of the second column are turned off. As a result, the first sub-array of induction electrodes M1 and the third sub-array of induction electrodes M3 can recognize different touch coordinates.

That is to say, each four induction electrodes 110 can form a sub-array of induction electrodes, and these sub-arrays of induction electrodes are electrically isolated from one another so as to recognize different touch coordinates. With this configuration, the sensing area of the touch display device 100A in the hovering touch mode can be improved to improve the touch accuracy and sensitivity.

The second period T2 is a period corresponding to the display mode of the touch display device 100A. During the second period T2, the first switches 130 can be turned off through the first driver 160, and the second switches 140 are also turned off through the second driver 170.

During the second period T2, the scan signal S_SCAN is at the enable level to turn on the thin film transistors in the substrate 120 (that is, the thin film transistors 126 of FIG. 1B), thus driving the pixel electrode (that is, the pixel electrodes 128 of FIG. 1B) and enabling the touch display device 100A to display the image. Although in FIG. 1D the scan signal S_SCAN is depicted as a square wave during the second period T2, the scan signal S_SCAN may be a plurality of pulse waves during the second period T2. During the second period T2, the touch signal S_TOUCH is at the disable level to prevent the touch display device 100A from being affected during the display mode.

Through the above driving manner, the induction electrodes 110 in the array are electrically isolated from one another during the second period T2 to prevent the display mode from being affected because of conduction between the induction electrodes 110 that are used as the common electrodes.

The third period T3 is a period corresponding to the click touch mode of the touch display device 100A. During the third period T3, the first switches 130 can be turned off through the first driver 160, and the second switches 140 are also turned off through the second driver 170.

During the third period T3, the scan signal S_SCAN is at the disable level to turn off the thin film transistors in the substrate 120 (that is, the thin film transistors 126 of FIG. 1B). During the third period T3, the touch signal S_TOUCH is at the enable level. At this time, the touch signal S_TOUCH can be used for performing click touch. Although in FIG. 1D the touch signal S_TOUCH is depicted as a square wave during the third period T3, the touch signal S_TOUCH may be a plurality of pulse waves during the third period T3.

Through the above driving manner, the induction electrodes 110 in the array are electrically isolated from one another during the third period T3. Hence, each of the induction electrodes 110 can couple capacitors to serve as a touch sensing source, so that the induction electrodes 110 can respectively recognize different click touch coordinates. Since the click touch causes a larger capacitance change, the induction electrodes 110 can be not formed into sub-arrays of induction electrodes selectively during the click touch period. However, the present disclosure is not limited in this regard. In other embodiments, at least part of the induction electrodes 110 may be connected during the click touch period depending on the touch requirement, thus forming sub-array(s) of induction electrodes.

The fourth period T4 is a period corresponding to the hovering touch mode of the touch display device 100A. Waveforms of the fourth period T4 may be the same as those of the first period T1. That is to say, waveforms following the third period T3 may periodically present waveforms of the first period T1, the second period T2, and the third period T3 in sequence. In some embodiments, a duration of the first period T1 is approximately 150 microseconds to 350 microseconds. A duration of the second period T2 is approximately 1000 microseconds to 2000 microseconds. A duration of the third period T3 is approximately 150 microseconds to 350 microseconds. Such a duration configuration can allow the touch display device 100A to be smoothly switched between the touch mode and the display mode.

Additionally, although the present embodiment is sequentially presented by the hovering touch mode, the display mode, and the click touch mode, the present disclosure is not limited in this regard. In other embodiments, the order may be changed. The waveform diagram depicted in FIG. 1D is merely used to illustrate that the induction electrodes 110 can be connected together during the hovering touch period, and is not intended to limit the present disclosure. In other embodiments, some other drive method may be adopted to connect different induction electrodes 110 and achieve the effect of improving the sensing area.

When a number of the induction electrodes 110 of the touch display device 100A is increased, the signals output by the first driver 160 and the second driver 170 can be adjusted according to the drive method depicted in FIG. 1D. For example, the first switches 130 of odd-numbered rows and the second switches 140 of odd-numbered columns may be turned on first, and the first switches 130 of even-numbered rows and the second switches 140 of even-numbered columns may be turned on at a later timing.

Figure 2A:
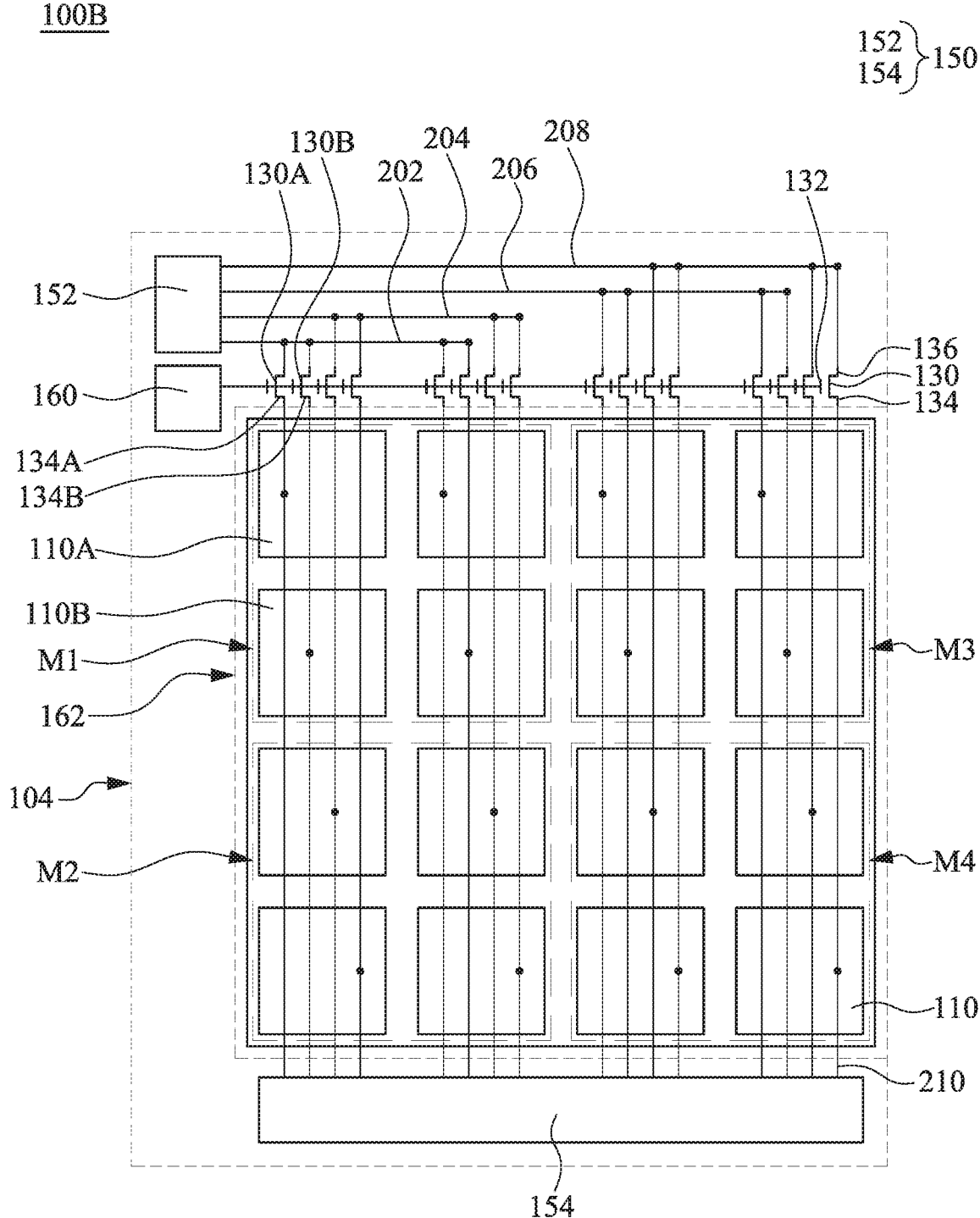
FIG. 2A depicts a top schematic diagram of a touch display device according to a second embodiment of the present disclosure.

A description is provided with reference to FIG. 2A. FIG. 2A depicts a top schematic diagram of a touch display device 100B according to a second embodiment of the present disclosure. At least one difference between the present embodiment and the first embodiment is that the first switches 130 are located outside the display area 102 and within the peripheral area 104, and the first switches 130 and the induction electrodes 110 are connected in a one-to-one manner. In addition to that, since in the present embodiment the first switches 130 can be arranged as "the first switches in a same row", "the second switches" is not used to name as in the first embodiment, and that must be explained first.

In greater detail, each of the first switches 130 has the first gate 132, the first source/drain 134, and the second source/drain 136. The first gates 132 of the first switches 130 are connected to the first driver 160, so that the first driver 160 can simultaneously drive the first switches 130. The first sources/drains 134 of the first switches 130 can be connected to different induction electrodes 110, respectively. For example, the first source/drain 134A of the first switch 130A is connected to the induction electrode 110A, and the first source/drain 134G of the first switch 130G is connected to the induction electrode 110G.

The touch display device 100B further comprises a first wiring 202, a second wiring 204, a third wiring 206, and a fourth wiring 208. The second sources/drains 136 of the first switches 130 are connected to the wirings correspondingly. As shown in FIG. 2A, each of the wirings can be connected to four first switches 130.

With the above configuration, the first switches 130 can electrically connect two adjacent induction electrodes 110 in a same column of the array or two adjacent induction electrodes 110 in a same row of the array so as to form a plurality of sub-arrays of induction electrodes. That is to say, different induction electrodes 110 in the array can be connected to a same wiring through the first switches 130 correspondingly so as to be electrically connected together, and further form the sub-arrays of induction electrodes.

For example, after turning on the first switches 130, the induction electrodes 110 connected to the first wiring 202 through the first switches 130 together can form a first sub-array of induction electrodes M1, and the first sub-array of induction electrodes M1 has 2 rows and 2 columns. The induction electrodes 110 connected to the second wiring 204 through the first switches 130 together can form a second sub-array of induction electrodes M2, and the second sub-array of induction electrodes M2 has 2 rows and 2 columns. The induction electrodes 110 connected to the third wiring 206 through the first switches 130 together can form a third sub-array of induction electrodes M3, and the third sub-array of induction electrodes M3 has 2 rows and 2 columns. The induction electrodes 110 connected to the fourth wiring 208 through the first switches 130 together can form a fourth sub-array of induction electrodes M4, and the fourth sub-array of induction electrodes M4 has 2 rows and 2 columns.

In the present embodiment, the touch circuit 150 of the touch display device 100B can be divided into a hovering touch circuit 152 and a click touch circuit 154. The hovering touch circuit 152 and the click touch circuit 154 are located within the peripheral area 104, and the hovering touch circuit 152 may be located on an upper side of the display area 102 and the click touch circuit 154 may be located on a lower side of the display area 102.

The hovering touch circuit 152 can be connected to the first switches 130 through the first wiring 202, the second wiring 204, the third wiring 206, and the fourth wiring 208, so as to be connected to the induction electrodes 110 through the first switches 130. Therefore, when the touch display device 100B is in a hovering touch mode, the hovering touch circuit 152 can input hovering touch signals to the induction electrodes 110 through the corresponding wirings and first switches 130. The click touch circuit 154 can be connected to the induction electrodes 110 through fifth wirings 210 of the touch display device 100B. Therefore, when the touch display device 100B is in a click touch mode, the click touch circuit 154 can input a click touch signal to the induction electrodes 110 through the fifth wirings 210.

In addition, the hovering touch circuit 152 and the click touch circuit 154 may output signals independently. That is, the hovering touch circuit 152 outputs the signals at an enable level and the click touch circuit 154 outputs a signal at a disable level in the hovering touch mode. Conversely, the click touch circuit 154 outputs the signal at the enable level and the hovering touch circuit 152 outputs the signals at the disable level in the click touch mode.

With the above configuration, when the touch display device 100B is in the hovering touch mode, the induction electrodes 110 in each of the sub-arrays of induction electrodes are electrically connected together by turning on the first switches 130 so as to improve the sensing area. In addition, different sub-arrays of induction electrodes are electrically isolated from one another because the different sub-arrays of induction electrodes are respectively connected to different wirings. As a result, the hovering touch circuit 152 can output the hovering touch signals to the different sub-arrays of induction electrodes independently.

Although in the present embodiment the induction electrodes 110 are arranged into an array having 4 columns and 4 rows, the present disclosure is not limited in this regard. In other embodiments, the induction electrodes 110 are another array that can be arranged in M columns and N rows, where each of M and N is a positive integer.

Figure 2B:
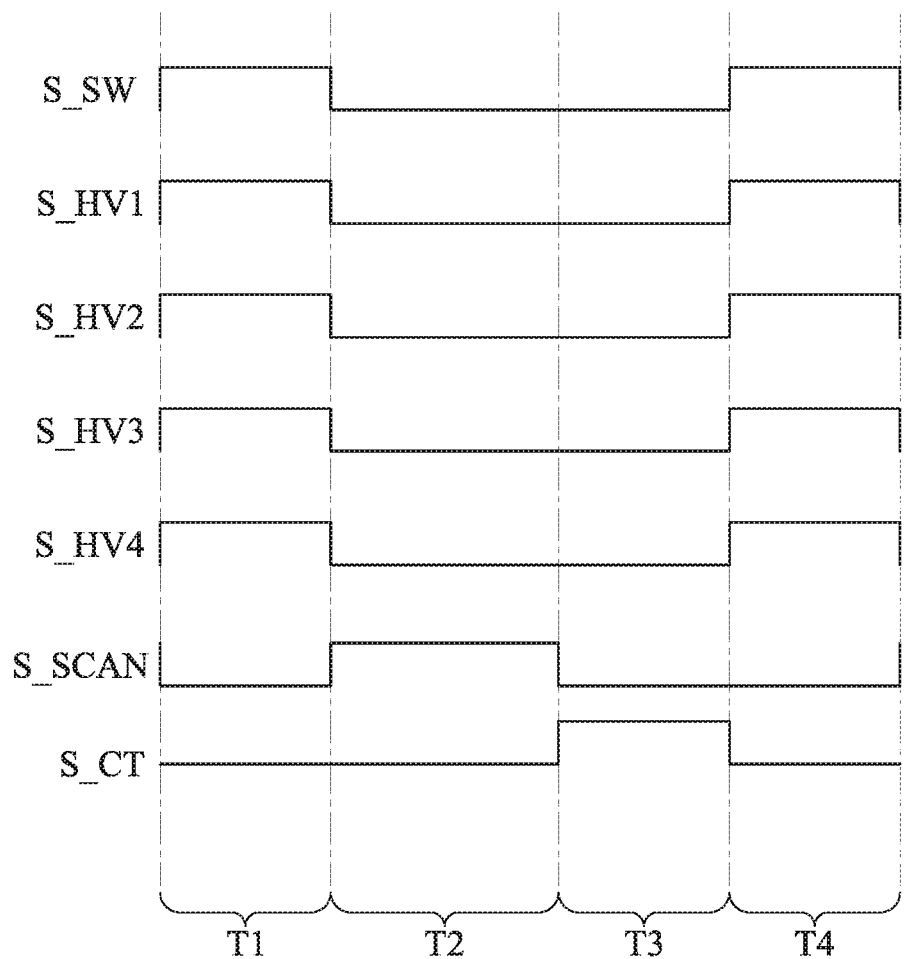
FIG. 2B depicts a waveform diagram of the touch display device in FIG. 2A when operating.

A further description is provided as follows with reference to waveforms output by the first driver 160, the hovering touch circuit 152, and the click touch circuit 154. A description is provided with reference to FIG. 2A and FIG. 2B. FIG. 2B depicts a waveform diagram of the touch display device 100B in FIG. 2A when operating. The waveform diagram depicted in FIG. 2B can be sequentially divided into a first period T1, a second period T2, a third period T3, and a fourth period T4.

A switch signal S_SW is a signal output from the first driver 160 to the first switches 130 in a same row. Signals output from the hovering touch circuit 152 to each of the wirings are labeled as a first hovering touch signal S_HV1, a second hovering touch signal S_HV2, a third hovering touch signal S_HV3, and a fourth hovering touch signal S_HV4 in FIG. 2B. A scan signal S_SCAN represents the signal input to scan lines. A click touch signal S_CT represents the signal output from click touch circuit 154.

The first period T1 is a period corresponding to the hovering touch mode of the touch display device 100B. During the first period T1, the first switches 130 can be turned on through the first driver 160, so that the induction electrodes 110 form the first sub-array of induction electrodes M1, the second sub-array of induction electrodes M2, the third sub-array of induction electrodes M3, and the fourth sub-array of induction electrodes M4.

During the first period T1, the first hovering touch signal S_HV1, the second hovering touch signal S_HV2, the third hovering touch signal S_HV3, and the fourth hovering touch signal S_HV4 can be output from the hovering touch circuit 152. The first hovering touch signal S_HV1, the second hovering touch signal S_HV2, the third hovering touch signal S_HV3, and the fourth hovering touch signal S_HV4 are respectively input to the first sub-array of induction electrodes M1, the second sub-array of induction electrodes M2, the third sub-array of induction electrodes M3, and the fourth sub-array of induction electrodes M4 through the first wiring 202, the second wiring 204, the third wiring 206, and the fourth wiring 208. Although in FIG. 2B the first hovering touch signal S_HV1, the second hovering touch signal S_HV2, the third hovering touch signal S_HV3, and the fourth hovering touch signal S_HV4 are depicted as square waves during the first period T1, each of these hovering touch signals may be a plurality of pulse waves during the first period T1.

During the first period T1, the scan signal S_SCAN is at the disable level to turn off thin film transistors correspondingly, and the click touch signal S_CT is also at the disable level to prevent the hovering touch mode from being affected.

Through the above configuration, the sub-arrays of induction electrodes can recognize different touch coordinates during the first period T1. With this configuration, the sensing area of the touch display device 100B in the hovering touch mode can be improved to improve the touch accuracy and sensitivity.

The second period T2 is a period corresponding to a display mode of the touch display device 100B. During the second period T2, the scan signal S_SCAN is at the enable level to turn on the corresponding thin film transistors, thus enabling the touch display device 100B to display an image. Although in FIG. 2B the scan signal S_SCAN is depicted as a square wave during the second period T2, the scan signal S_SCAN may be a plurality of pulse waves during the second period T2. During the second period T2, the click touch signal S_CT is at the disable level to prevent the touch display device 100B from being affected during the display mode.

Through the above configuration, the induction electrodes 110 in the array are electrically isolated from one another during the second period T2 to prevent the display mode from being affected because of conduction between the induction electrodes 110 that are used as common electrodes.

The third period T3 is a period corresponding to the click touch mode of the touch display device 100B. During the third period T3, the scan signal S_SCAN is at the disable level to turn off the corresponding thin film transistors. During the third period T3, the click touch signal S_CT is at the enable level. Although in FIG. 2B the click touch signal S_CT is depicted as a square wave during the third period T3, the click touch signal S_CT may be a plurality of pulse waves during the third period T3.

Through the above driving manner, the induction electrodes 110 can respectively recognize different touch coordinates during the third period T3 because the induction electrodes 110 in the array are electrically isolated from one another. However, the present disclosure is not limited in this regard. In other embodiments, at least part of the induction electrodes 110 can be connected during the click touch operation to form sub-array(s) of induction electrodes depending on the touch requirement.

The fourth period T4 is a period corresponding to the hovering touch mode of the touch display device 100B. Waveforms of the fourth period T4 may be the same as those of the first period T1. That is to say, waveforms following the third period T3 may periodically present waveforms of the first period T1, the second period T2, and the third period T3 in sequence. In some embodiments, a duration of the first period T1 is approximately 150 microseconds to 350 microseconds. A duration of the second period T2 is approximately 1000 microseconds to 2000 microseconds. A duration of the third period T3 is approximately 150 microseconds to 350 microseconds. Such a duration configuration can allow the touch display device 100B to be smoothly switched between the touch mode and the display mode.

In addition to that, although the present embodiment is sequentially presented by the hovering touch mode, the display mode, and the click touch mode, the present disclosure is not limited in this regard. In other embodiments, the order may be changed. The waveform diagram depicted in FIG. 2B is merely used to illustrate that the induction electrodes 110 can be connected together during the hovering touch period, and is not intended to limit the present disclosure. In other embodiments, some other drive method may be adopted to connect different induction electrodes 110 and achieve the effect of improving the sensing area.

Figure 3A:
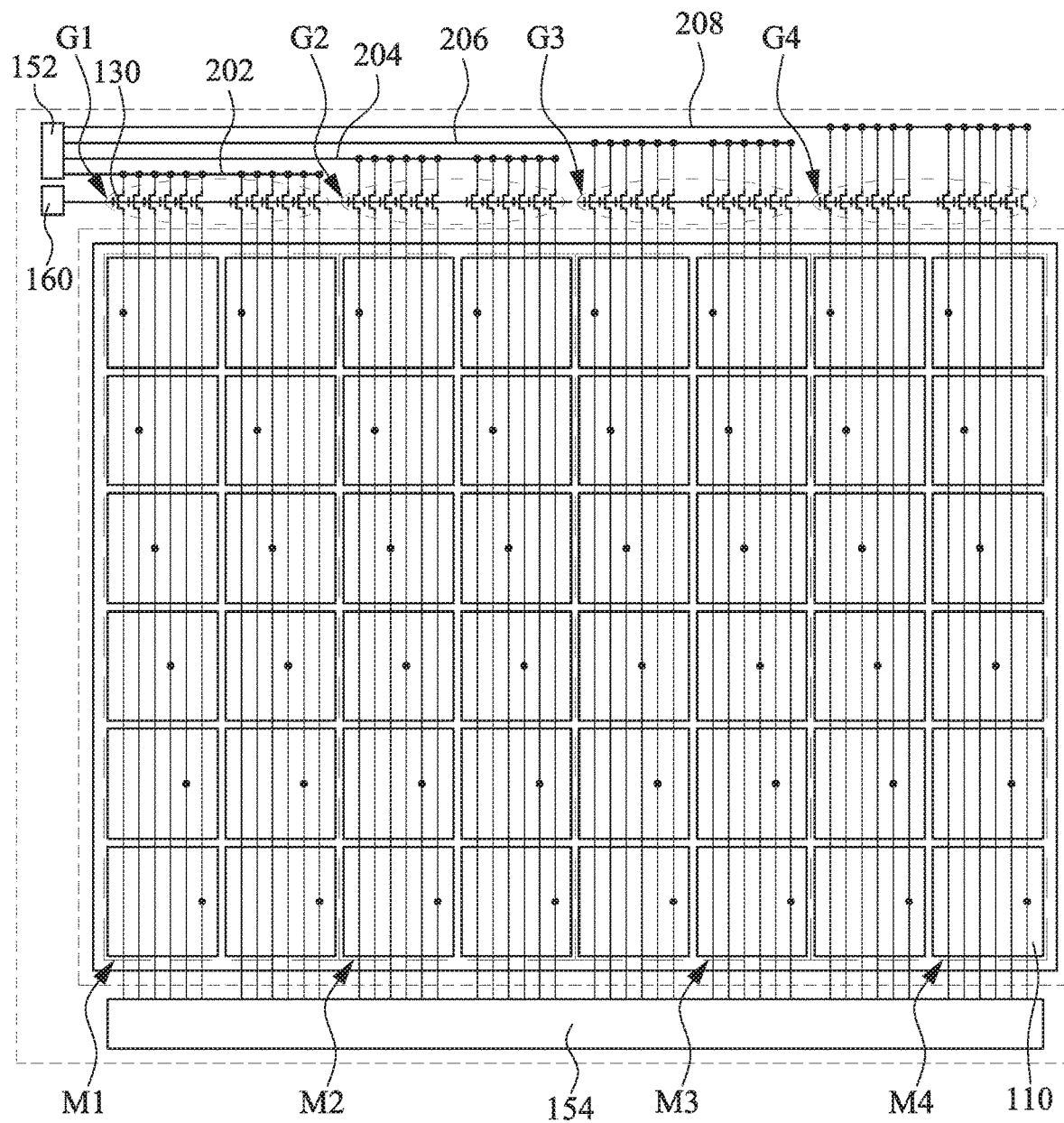
FIG. 3A depicts a top schematic diagram of a touch display device according to a third embodiment of the present disclosure.

A description is provided with reference to FIG. 3A. FIG. 3A depicts a top schematic diagram of a touch display device 100C according to a third embodiment of the present disclosure. At least one difference between the present embodiment and the second embodiment is that the induction electrodes 110 in each of the columns of the array according to the present embodiment together form a same sub-array of induction electrodes.

In greater detail, the induction electrodes 110 connected to the first wiring 202 through a first group G1 of the first switches 130 (that is, all of the induction electrodes 110 in a first column and a second column of the array) together can form a first sub-array of induction electrodes M1, and the first sub-array of induction electrodes M1 has 6 rows and 2 columns. The induction electrodes 110 connected to the second wiring 204 through a second group G2 of the first switches 130 (that is, all of the induction electrodes 110 in a third column and a fourth column of the array) together can form a second sub-array of induction electrodes M2, and the second sub-array of induction electrodes M2 has 6 rows and 2 columns. The induction electrodes 110 connected to the third wiring 206 through a third group G3 of the first switches 130 (that is, all of the induction electrodes 110 in a fifth column and a sixth column of the array) together can form a third sub-array of induction electrodes M3, and the third sub-array of induction electrodes M3 has 6 rows and 2 columns. The induction electrodes 110 connected to the fourth wiring 208 through a fourth group G4 of the first switches 130 (that is, all of the induction electrodes 110 in a seventh column and an eighth column of the array) together can form a fourth sub-array of induction electrodes M4, and the fourth sub-array of induction electrodes M4 has 6 rows and 2 columns.

Although in the present embodiment the induction electrodes 110 are an array arranged in 8 columns and 6 rows, the present disclosure is not limited in this regard. In other embodiments, the induction electrodes 110 are another array that can be arranged in M columns and N rows, where each of M and N is a positive integer.

In the present embodiment, the drive method for the sub-arrays of induction electrodes may be sequentially performed during the hovering touch period. A further description is provided as follows with reference to waveforms output by the first driver 160, the hovering touch circuit 152, and the click touch circuit 154.

Figure 3B:
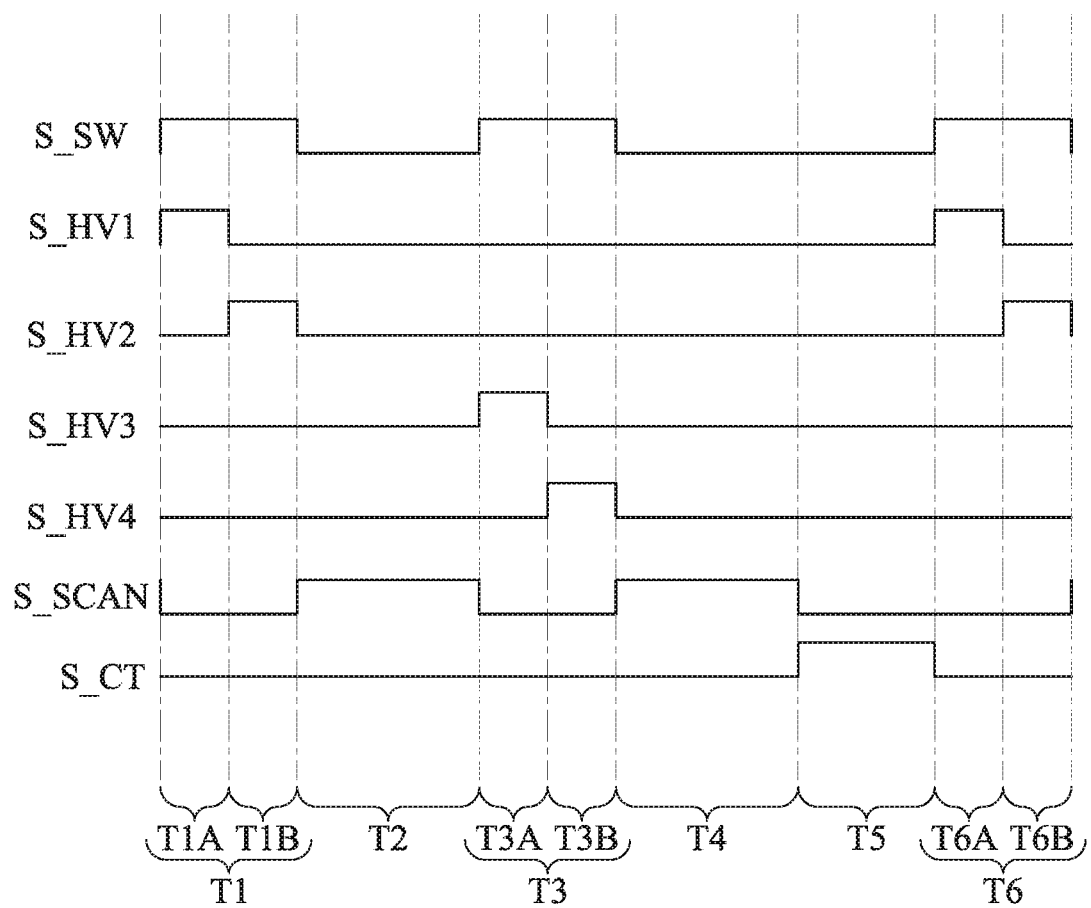
FIG. 3B depicts a waveform diagram of the touch display device in FIG. 3A when operating.

A description is provided with reference to FIG. 3A and FIG. 3B. FIG. 3B depicts a waveform diagram of the touch display device 100C in FIG. 3A when operating. The waveform diagram depicted in FIG. 3B can be sequentially divided into a first period T1, a second period T2, a third period T3, a fourth period T4, a firth period T5, and a sixth period T6. The first period T1 can be divided into a first sub-period T1A and a second sub-period T1B. The third period T3 can be divided into a third sub-period T3A and a fourth sub-period T3B. The sixth period T6 can be divided into a fifth sub-period T6A and a sixth sub-period T6B.

A switch signal S_SW is a signal output from the first driver 160 to the first switches 130 in a same row. Signals output from the hovering touch circuit 152 to each of the wirings are labeled as a first hovering touch signal S_HV1, a second hovering touch signal S_HV2, a third hovering touch signal S_HV3, and a fourth hovering touch signal S_HV4 in FIG. 3B. A scan signal S_SCAN represents the signal input to scan lines. A click touch signal S_CT represents the signal output from click touch circuit 154.

The first period T1 is a period corresponding to a hovering touch mode of the touch display device 100C. During the first period T1, the first switches 130 can be turned on through the first driver 160, so that the induction electrodes 110 form the first sub-array of induction electrodes M1, the second sub-array of induction electrodes M2, the third sub-array of induction electrodes M3, and the fourth sub-array of induction electrodes M4.

During the first sub-period T1A of the first period T1, the first hovering touch signal S_HV1 can be output from the hovering touch circuit 152, so that the first hovering touch signal S_HV1 can be input to the first sub-array of induction electrodes M1 through the first wiring 202. During the second sub-period T1B of the first period T1, the second hovering touch signal S_HV2 can be output from the hovering touch circuit 152, so that the second hovering touch signal S_HV2 can be input to the second sub-array of induction electrodes M2 through the second wiring 204. Therefore, during the first period T1, the touch display device 100C can scan hovering touch operations corresponding to positions of the first sub-array of induction electrodes M1 and the second sub-array of induction electrodes M2. Although in FIG. 3B the first hovering touch signal S_HV1 and the second hovering touch signal S_HV2 are depicted as square waves during the first period T1, each of these hovering touch signals may be a plurality of pulse waves during the first period T1.

During the first period T1, the scan signal S_SCAN is at a disable level to turn off thin film transistors correspondingly, and the click touch signal S_CT is also at the disable level to prevent the hovering touch mode from being affected.

The second period T2 is a period corresponding to a display mode of the touch display device 100C. During the second period T2, the scan signal S_SCAN is at an enable level to turn on the corresponding thin film transistors, thus enabling the touch display device 100C to display an image. Although in FIG. 3B the scan signal S_SCAN is depicted as a square wave during the second period T2, the scan signal S_SCAN may be a plurality of pulse waves during the second period T2. During the second period T2, the click touch signal S_CT is at the disable level to prevent the touch display device 100C from being affected during the display mode.

Through the above configuration, the induction electrodes 110 in the array are electrically isolated from one another during the second period T2 to prevent the display mode from being affected because of conduction between the induction electrodes 110 that are used as common electrodes.

The third period T3 is a period corresponding to the hovering touch mode of the touch display device 100C. During the third period T3, the first switches 130 can be turned on through the first driver 160, so that the induction electrodes 110 form the first sub-array of induction electrodes M1, the second sub-array of induction electrodes M2, the third sub-array of induction electrodes M3, and the fourth sub-array of induction electrodes M4.

During the third sub-period T3A of the third period T3, the third hovering touch signal S_HV3 can be output from the hovering touch circuit 152, so that the third hovering touch signal S_HV3 can be input to the third sub-array of induction electrodes M3 through the third wiring 206. During the fourth sub-period T3B of the third period T3, the fourth hovering touch signal S_HV4 can be output from the hovering touch circuit 152, so that the fourth hovering touch signal S_HV4 can be input to the fourth sub-array of induction electrodes M4 through the fourth wiring 208. Therefore, during the third period T3, the touch display device 100C can scan hovering touch operations corresponding to positions of the third sub-array of induction electrodes M3 and the fourth sub-array of induction electrodes M4. Although in FIG. 3B the third hovering touch signal S_HV3 and the fourth hovering touch signal S_HV4 are depicted as square waves during the third period T3, each of these hovering touch signals may be a plurality of pulse waves during the third period T3.

During the third period T3, the scan signal S_SCAN is at the disable level to turn off the corresponding thin film transistors, and the click touch signal S_CT is also at the disable level to prevent the hovering touch mode from being affected.

The fourth period T4 is a period corresponding to the display mode of the touch display device 100C. During the fourth period T4, the scan signal S_SCAN is at the enable level to turn on the corresponding thin film transistors, thus enabling the touch display device 100C to display the image. Although in FIG. 3B the scan signal S_SCAN is depicted as a square wave during the fourth period T4, the scan signal S_SCAN may be a plurality of pulse waves during the fourth period T4. During the fourth period T4, the click touch signal S_CT is at the disable level to prevent the touch display device 100C from being affected during the display mode.

The fifth period T5 is a period corresponding to a click touch mode of the touch display device 100C. During the fifth period T5, the first switches 130 can be turned off through the first driver 160, and the hovering touch circuit 152 also outputs signals at the disable level. During the fifth period T5, the scan signal S_SCAN is at the disable level to turn off the corresponding thin film transistors. During the fifth period T5, the click touch signal S_CT is at the enable level. Although in FIG. 3B the click touch signal S_CT is depicted as a square wave during the fifth period T5, the click touch signal S_CT may be a plurality of pulse waves during the fifth period T5.

Through the above driving manner, the induction electrodes 110 can respectively recognize different touch coordinates during the fifth period T5 because the induction electrodes 110 in the array are electrically isolated from one another. However, the present disclosure is not limited in this regard. In other embodiments, at least part of the induction electrodes 110 can be connected during the click touch operation to form sub-array(s) of induction electrodes depending on the touch requirement.

The sixth period T6 is a period corresponding to the hovering touch mode of the touch display device 100C. Waveforms of the fifth sub-period T6A and the sixth sub-period T6B of the sixth period T6 may be the same as those of the first sub-period T1A and the second sub-period T1B of the first period T1. That is to say, waveforms following the fifth period T5 may periodically present waveforms of the first period T1, the second period T2, the third period T3, the fourth period T4, and the fifth period T5 in sequence. In some embodiments, a duration of the first period T1 is approximately 150 microseconds to 350 microseconds. A duration of the second period T2 is approximately 1000 microseconds to 2000 microseconds. A duration of the third period T3 is approximately 150 microseconds to 350 microseconds. A duration of the fourth period T4 is approximately 1000 microseconds to 2000 microseconds. A duration of the fifth period T5 is approximately 200 microseconds to 300 microseconds. Such a duration configuration can allow the touch display device 100C to be smoothly switched between the touch mode and the display mode.

Additionally, although the present embodiment is sequentially presented by the hovering touch mode, the display mode, and the click touch mode, the present disclosure is not limited in this regard. In other embodiments, the order may be changed.

Figure 3C:
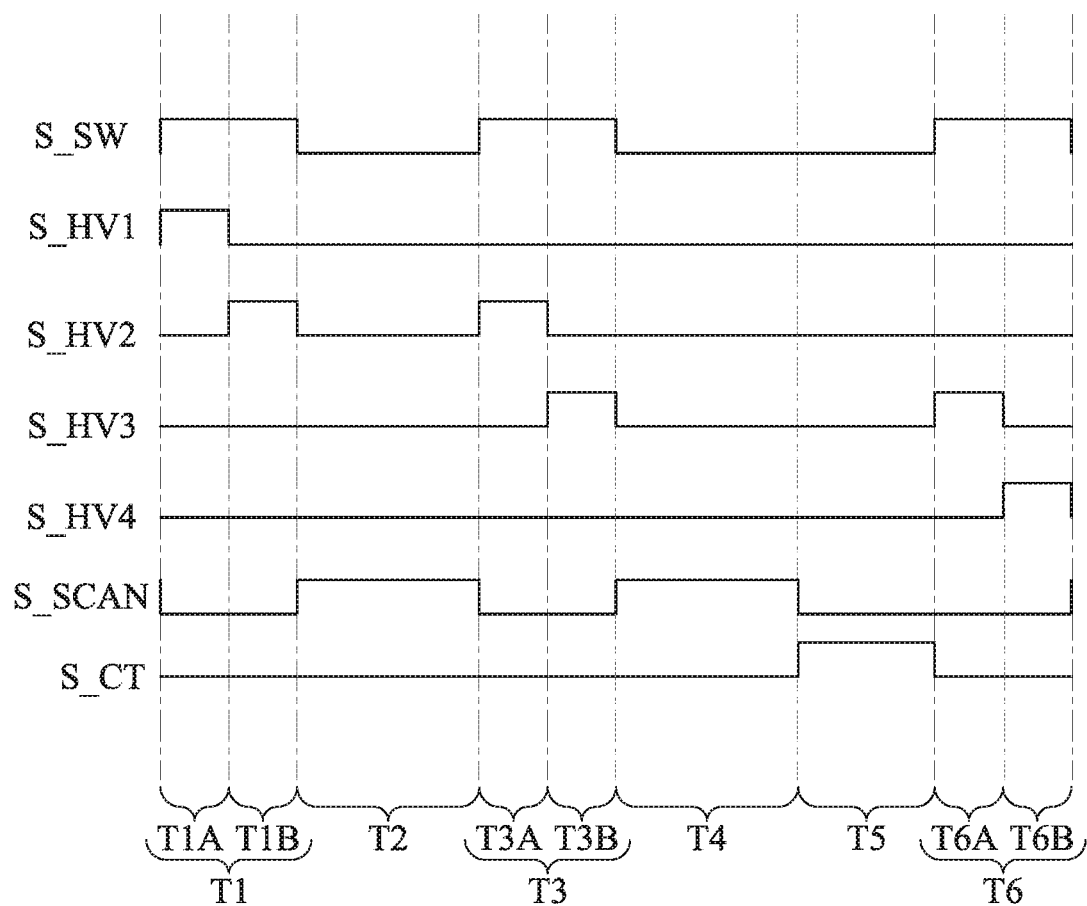
FIG. 3C depicts another waveform diagram of the touch display device in FIG. 3A when operating.

In addition to the drive method depicted in FIG. 3B, some other drive method can be adopted for the touch display device 100C of FIG. 3A. For example, a description is provided with reference to FIG. 3A and FIG. 3C. FIG. 3C depicts another waveform diagram of the touch display device 100C in FIG. 3A when operating. The waveform diagram depicted in FIG. 3C can be sequentially divided into a first period T1, a second period T2, a third period T3, a fourth period T4, a fifth period T5, and a sixth period T6. The first period T1 can be divided into a first sub-period T1A and a second sub-period T1B. The third period T3 can be divided into a third sub-period T3A and a fourth sub-period T3B. The sixth period T6 can be divided into a fifth sub-period T6A and a sixth sub-period T6B.

A switch signal S_SW is a signal output from the first driver 160 to the first switches 130 in a same row. Signals output from the hovering touch circuit 152 to each of the wirings are labeled as a first hovering touch signal S_HV1, a second hovering touch signal S_HV2, a third hovering touch signal S_HV3, and a fourth hovering touch signal S_HV4 in FIG. 3C. A scan signal S_SCAN represents the signal input to scan lines. A click touch signal S_CT represents the signal output from the click touch circuit 154.

Since waveforms depicted in the first period T1, the second period T2, the fourth period T4, and the fifth period T5 of FIG. 3C are the same as those depicted in the first period T1, the second period T2, the fourth period T4, and the fifth period T5 of FIG. 3B, a description in this regard is not provided.

The third period T3 corresponds to a hovering touch mode of the touch display device 100C. During the third period T3, the first switches 130 can be turned on through the first driver 160, so that the induction electrodes 110 form the first sub-array of induction electrodes M1, the second sub-array of induction electrodes M2, the third sub-array of induction electrodes M3, and the fourth sub-array of induction electrodes M4.

During the third sub-period T3A of the third period T3, the second hovering touch signal S_HV2 can be output from the hovering touch circuit 152, so that the second hovering touch signal S_HV2 can be input to the second sub-array of induction electrodes M2 through the second wiring 204. During the fourth sub-period T3B of the third period T3, the third hovering touch signal S_HV3 can be output from the hovering touch circuit 152, so that the third hovering touch signal S_HV3 can be input to the third sub-array of induction electrodes M3 through the third wiring 206. Therefore, during the third period T3, the touch display device 100C can scan hovering touch operations corresponding to positions of the second sub-array of induction electrodes M2 and the third sub-array of induction electrodes M3. Although in FIG. 3C the second hovering touch signal S_HV2 and the third hovering touch signal S_HV3 are depicted as square waves during the third period T3, each of these hovering touch signals may be a plurality of pulse waves during the third period T3.

During the third period T3, the scan signal S_SCAN is at a disable level to turn off thin film transistors correspondingly, and the click touch signal S_CT is also at the disable level to prevent the hovering touch mode from being affected.

Through the above driving manner, the touch display device 100C scans the hovering touch operations corresponding to the position of the second sub-array of induction electrodes M2 during the first period T1 and the third period T3. That is to say, the second sub-array of induction electrodes M2 is repeatedly driven during one scan cycle of the hovering touch. Through this configuration, not only can the touch accuracy and sensitivity be improved by improving the sensing area of the touch display device for the hovering touch, but the touch resolution can also be improved by adopting the repeated drive method to scan the hovering touch operations, thus further improving the touch accuracy and sensitivity.

The sixth period T6 corresponds to the hovering touch mode of the touch display device 100C. During the sixth period T6, the first switches 130 can be turned on through the first driver 160, so that the induction electrodes 110 form the first sub-array of induction electrodes M1, the second sub-array of induction electrodes M2, the third sub-array of induction electrodes M3, and the fourth sub-array of induction electrodes M4.

During the fifth sub-period T6A of the sixth period T6, the third hovering touch signal S_HV3 can be output from the hovering touch circuit 152, so that the third hovering touch signal S_HV3 can be input to the third sub-array of induction electrodes M3 through the third wiring 206. During the sixth sub-period T6B of the sixth period T6, the fourth hovering touch signal S_HV4 can be output from the hovering touch circuit 152, so that the fourth hovering touch signal S_HV4 can be input to the fourth sub-array of induction electrodes M4 through the fourth wiring 208. Therefore, during the sixth period T6, the touch display device 100C can scan hovering touch operations corresponding to positions of the third sub-array of induction electrodes M3 and the fourth sub-array of induction electrodes M4. Although in FIG. 3C the third hovering touch signal S_HV3 and the fourth hovering touch signal S_HV4 are depicted as square waves during the sixth period T6, each of these hovering touch signals may be a plurality of pulse waves during the sixth period T6.

During the sixth period T6, the scan signal S_SCAN is at the disable level to turn off the corresponding thin film transistors, and the click touch signal S_CT is also at the disable level to prevent the hovering touch mode from being affected.

Similarly, through the above driving manner, the touch display device 100C scans the hovering touch operations corresponding to the position of the third sub-array of induction electrodes M3 during the third period T3 and the sixth period T6. As a result, the touch resolution is improved to further improve the touch accuracy and sensitivity.

A display mode or a click touch mode may be performed again after the sixth period T6. Alternatively, waveforms of the first period T1 may be repeated, so that waveforms following the sixth period T6 may periodically present waveforms of the first period T1, the second period T2, the third period T3, the fourth period T4, the fifth period T5, and the sixth period T6 in sequence. In some embodiments, a duration of the first period T1 is approximately 150 microseconds to 350 microseconds. A duration of the second period T2 is approximately 1000 microseconds to 2000 microseconds. A duration of the third period T3 is approximately 150 microseconds to 350 microseconds. A duration of the fourth period T4 is approximately 1000 microseconds to 2000 microseconds. A duration of the fifth period T5 is approximately 200 microseconds to 300 microseconds. A duration of the sixth period T6 is approximately 150 microseconds to 300 microseconds. Such a duration configuration can allow the touch display device 100C to be smoothly switched between the touch mode and the display mode.

Although the waveform diagrams depicted in FIG. 3B and FIG. 3C cause the touch display device 100C to scan from a left side of the display area 102 to a right side of the display area 102 in the hovering touch mode, the present disclosure is not limited in this regard. In some embodiments, the scanning of the touch display device 100C in the hovering touch mode may be performed from the right side of the display area 102 to the left side of the display area 102. In some embodiments, the scanning of the touch display device 100C in the hovering touch mode may be performed from the left side and the right side of the display area 102 to a middle of the display area 102.

Additionally, although the present embodiment is sequentially presented by the hovering touch mode, the display mode, the hovering touch mode, the display mode, the click touch mode, and the hovering touch mode, the present disclosure is not limited in this regard. In other embodiments, the order in the above cycle may be changed to another order.

Figure 4:
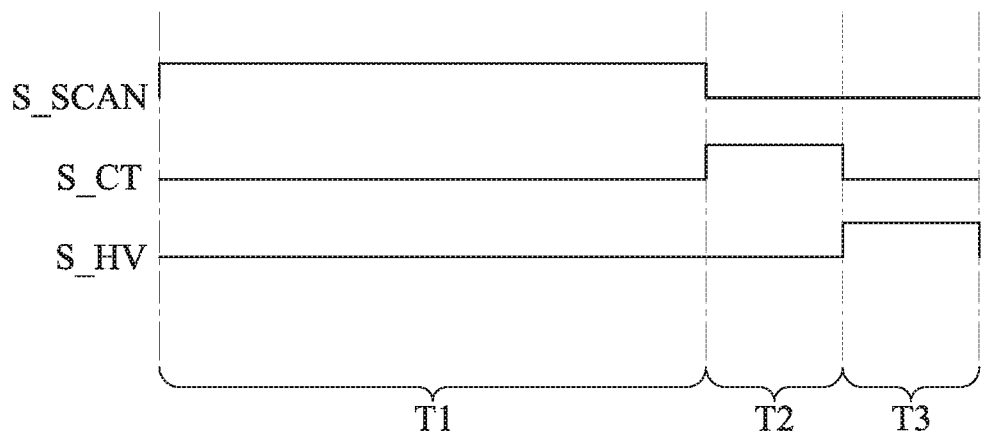
FIG. 4 depicts a waveform diagram of a touch display device when operating according to a fourth embodiment of the present disclosure.

A description is provided with reference to FIG. 4. FIG. 4 depicts a waveform diagram of a touch display device when operating according to a fourth embodiment of the present disclosure. At least one difference between the present embodiment and the above embodiments is that the operation method in each cycle according to the present embodiment is in a display mode, a click touch mode, and a hovering touch mode in sequence. The waveform diagram depicted in FIG. 4 can be sequentially divided into a first period T1, a second period T2, and a third period T3. A scan signal S_SCAN represents the signal input to scan lines. A click touch signal S_CT represents the signal for performing a click touch. A hovering touch signal S_HV represents the signal for performing a hovering touch. The waveform diagram depicted in FIG. 4 can also be applied to the touch display devices of the above embodiments.

The first period T1 is a period corresponding to the display mode of the touch display device. During the first period T1, the scan signal S_SCAN is at an enable level to turn on thin film transistors correspondingly, thus enabling the touch display device to display an image. Although in FIG. 4 the scan signal S_SCAN is depicted as a square wave during the first period T1, the scan signal S_SCAN may be a plurality of pulse waves during the first period T1. During the first period T1, the click touch signal S_CT is at a disable level to prevent the touch display device from being affected during the display mode.

The second period T2 is a period corresponding to the click touch mode of the touch display device. During the second period T2, the scan signal S_SCAN is at the disable level to turn off the corresponding thin film transistors. During the second period T2, the click touch signal S_CT is at the enable level. Although in FIG. 4 the click touch signal S_CT is depicted as a square wave during the second period T2, the click touch signal S_CT may be a plurality of pulse waves during the second period T2.

During the second period T2, the hovering touch signal S_HV is at the disable level. Here, "the hovering touch signal S_HV is at the disable level" as described in the present embodiment may refer to: if the touch display device has mechanism(s) for increasing the sensing area, the mechanism(s) will be temporarily suspended. For example, the above touch display device uses the thin film transistors to conduct different induction electrodes. During the second period T2, signals output to the thin film transistors correspondingly are at the disable level, so that the different induction electrodes are electrically isolated from one another. In addition, if the touch display device has a signal for performing the hovering touch output from a hovering touch circuit, this signal is also at the disable level.

The third period T3 corresponds to the hovering touch mode of the touch display device. During the third period T3, the scan signal S_SCAN is at the disable level to turn off the corresponding thin film transistors, and the click touch signal S_CT is also at the disable level to prevent the hovering touch mode from being affected.

During the third period T3, the hovering touch signal S_HV is at the enable level. Here, "the hovering touch signal S_HV is at the enable level" as described in the present embodiment may refer to: if the touch display device has the mechanism(s) for increasing the sensing area, the mechanism(s) will be turned on. For example, the above touch display device uses the thin film transistors to conduct the different induction electrodes. During the third period T3, the signals output to the thin film transistors correspondingly are at the enable level, so that the different induction electrodes are electrically connected to one another. In addition to that, if the touch display device has the signal for performing the hovering touch output from the hovering touch circuit, this signal is also at the enable level.

For example, "the hovering touch signal S_HV is at the enable level" as described in the present embodiment may be performed as the hovering touch mode corresponding to the first period T1 of FIG. 1D as described in the first embodiment. "The hovering touch signal S_HV is at the enable level" as described in the present embodiment may be performed as the hovering touch mode corresponding to the first period T1 of FIG. 2B as described in the second embodiment. "The hovering touch signal S_HV is at the enable level" as described in the present embodiment may be continuously performed as the hovering touch modes corresponding to the first period T1 and the third period T3 of FIG. 3B as described in the third embodiment. "The hovering touch signal S_HV is at the enable level" as described in the present embodiment may be continuously performed as the hovering touch modes corresponding to the first period T1, the third period T3, and the sixth period T6 of FIG. 3C as described in the third embodiment.

That is to say, hovering touches corresponding to different areas may be continuously performed during the third period T3 according to the present embodiment. Therefore, the hovering touch signal S_HV may be a plurality of pulse waves during the third period T3 although in FIG. 4 the hovering touch signal S_HV is depicted as a square wave during the third period T3.

In some embodiments, a duration of the first period T1 is approximately 12.17 milliseconds to 14.5 milliseconds. A duration of the second period T2 is approximately 2.5 milliseconds to 3 milliseconds. A duration of the third period T3 is approximately 2 milliseconds to 2.5 milliseconds. Such a duration configuration can allow the touch display device to be smoothly switched between the touch mode and the display mode.

In summary, the touch display device according to the present disclosure comprises the induction electrodes and the first switches. The induction electrodes are arranged into an array, and two adjacent induction electrodes in a same column of the array are electrically connected to each other through the first switch. Through this configuration, different induction electrodes can be connected after turning on switches so as to form a plurality of sub-arrays of induction electrodes. As a result, during the hovering touch mode of the touch display device, the touch accuracy and sensitivity can be improved by improving the sensing area of the hovering touch for the touch display device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display device having a display area, and comprising:
    a substrate;
    a plurality of induction electrodes disposed on the substrate and located within the display area, and the induction electrodes being arranged into an array;
    a plurality of first switches, each of the first switches having a first gate, wherein two adjacent induction electrodes in a same column of the array are electrically connected to each other through at least one of the first switches;
    a first driver connected to the first gates of the first switches;
    a first wiring and a second wiring, wherein each of the first switches has a second source/drain, the second sources/drains of a first group of the first switches are together connected to the first wiring, and the second sources/drains of a second group of the first switches are together connected to the second wiring; and
    a hovering touch circuit connected to the first switches through the first wiring and the second wiring.

2. The touch display device of claim 1, wherein each of the first switches has a first source/drain, and the first source/drain and the second source/drain of each of the first switches are respectively connected to two adjacent induction electrodes in the array.

3. The touch display device of claim 1, further comprising:
    a plurality of second switches, and each of the second switches having a second gate, a third source/drain, and a fourth source/drain, wherein the third source/drain and the fourth source/drain of the each of the second switches are respectively connected to two adjacent induction electrodes in a same row as the each of the second switches of the array; and
    a second driver connected to the second gates of the second switches.

4. The touch display device of claim 1, wherein each of the first switches has a first source/drain, and the first sources/drains are respectively connected to different induction electrodes.

5. The touch display device of claim 1, further comprising a plurality of pixel electrodes located within the display area, and a vertical projection of the induction electrodes on the substrate at least partially overlapping a vertical projection of the pixel electrodes on the substrate.

6. The touch display device of claim 1, wherein two adjacent induction electrodes in a same column of the array are physically spaced apart, and the touch display device further comprises:
    a plurality of third wirings spaced apart with each other, wherein at least one of the third wirings overlaps two of the induction electrodes, and the induction electrodes are respectively connected to the third wirings.

7. A method for driving a touch display device, comprising:
    turning on a plurality of switches during a first period;
    outputting a first hovering touch signal through a first wiring during the first period, so that the first hovering touch signal is input to a first sub-array of induction electrodes through a first group of the switches;
    outputting a second hovering touch signal through a second wiring during the first period, so that the second hovering touch signal is input to a second sub-array of induction electrodes through a second group of the switches;
    turning off the switches during a second period, wherein the second period is later than the first period;
    turning on the switches during a third period, wherein the third period is later than the second period;
    outputting a third hovering touch signal through the second wiring during the third period, so that the third hovering touch signal is input to the second sub-array of induction electrodes through the second group of the switches; and
    outputting a fourth hovering touch signal through a third wiring during the third period, so that the fourth hovering touch signal is input to a third sub-array of induction electrodes through a third group of the switches.

8. A touch display device having a display area, and comprising:
    a substrate;
    a plurality of induction electrodes disposed on the substrate and located within the display area, and the induction electrodes being arranged into an array;
    a plurality of first switches, each of the first switches having a first gate, wherein two adjacent induction electrodes in a same column of the array are electrically connected to each other through at least one of the first switches;
    a first driver connected to the first gates of the first switches; and
    a hovering touch circuit connected to the first switches.

9. The touch display device of claim 8, wherein two adjacent induction electrodes in a same column of the array are physically spaced apart, and the touch display device further comprises:
    a plurality of wirings spaced apart with each other, wherein at least one of the wirings overlaps two of the induction electrodes, and the induction electrodes are respectively connected to the wirings.

* * * * *